Patented Oct. 26, 1948

2,452,041

UNITED STATES PATENT OFFICE 2,452,041

MAKING CALCIUM ALUMINATE SINTER

Kelly L. Elmore, near Sheffield, Ala., assignor to Tennessee Valley Authority, a corporation of the United States No Drawing. Application August 17, 1944, Serial No. 549,944

4 Claims. (Cl. 23—52)

(Granted under the act of March 3, 1883, as amended April 30, 1928; 370 O. G. 757)

The invention herein described may be manufactured and used by or for the Government for governmental purposes without the payment to me of any royalty thereon.

This invention relates to the recovery of alumina from raw materials containing aluminum compounds, particularly relatively low-grade aluminiferous material containing a relatively high proportion of silica.

It has been proposed to produce alumina from high silica raw material by many methods including the sintering of such material with the proper proportion of limestone to produce calcium aluminates from which the alumina is subsequently extracted and the alumina precipitated from the extract. Some of the proposals are directed to the ratio of alumina, silica and calcium oxide which shall be present in a mixture to produce a sinter of highest extractable alumina.

The principal object of the present invention is to provide a method for the more rapid acceleration of the conversion of the relatively insoluble alumina in the raw material to soluble material in a sinter. Another object of this invention is to provide a method for the acceleration of the conversion of alumina into a soluble form using presently known methods insofar as the basic materials used for such conversion are concerned. Other objects of this invention include the provision of a method for economically accelerating the conversion of alumina in high silica raw material which will reduce the time for treatment of such material during sintering with a consequent increase in capacity of sintering apparatus.

The present invention is directed to a process of making a calcium sinter from finely divided aluminum ore and limestone whereby the alumina content of the ore is more readily rendered soluble in dilute sodium carbonate solutions by mixing intimately with the finely divided ore and limestone a small proportion of a material having a crystal structure and chemical composition of at least one of the principal end components of the sinter at equilibrium, and sintering the mixture so prepared.

In the conversion of the relatively insoluble alumina contained in high silica aluminiferous material, limestone or other calcium oxide containing a reagent is mixed with the material to produce a predetermined ratio of $Al_2O_3$, $CaO$, and $SiO_2$ in the sinter as required for the specific process employed. It is considered that the proportions of the constituents of the mixture are such as to produce in the sintered product silicates and aluminates predominately $2CaO.SiO_2$, $5CaO.3Al_2O_3$, and $CaO.Al_2O_3$. When a charge of the raw material and reagent is subjected to heat treatment, it is preferable to sinter rather than fuse in order that the products from the heat treatment may have the alumina more readily extracted therefrom. If such a charge were fused all of the constituents thereof would not only be associated with each other at a much higher temperature which would in itself accelerate the reactions involved, but they would also be in more intimate contact, thereby hastening the reaction to form the ultimate products resulting from the heat treatment. However, when the charge is merely sintered, a considerable time is required to produce the ultimate products even though the constituents of the charge are intimately mixed before and during the passage through the heating zone.

In the present invention a small proportion of material having a crystal structure and chemical composition of at least one of the principal end components of the sinter at equilibrium is added to the mixture of normal constituents of the charge before the sintering operation. The chemical components and crystallographic characteristics of such principal end components taken from E. S. Shepherd and G. A. Rankin, Ind. Eng. Chem. 3, 211-27 (1911), are shown in Table I.

Table I

| Compound | Temperature stability, °C. | Index of refraction | Crystal system | Other Characteristics |
|---|---|---|---|---|
| $\alpha 2CaO.SiO_2$ | Above 1410 | $\alpha=1.714, \beta=1.720, \gamma=1.737$ | | Optically positive. |
| $\beta 2CaO.SiO_2$ | 675–1410 | $\alpha=$about 1.72, $\gamma=$about 1.735 | Orthorhombic | 2E=52°. |
| $\gamma 2CaO.SiO_2$ | Below 675 | $\alpha=1.640\pm0.003, \beta=1.645\pm0.003, \gamma=1.654\pm0.003$ | | |
| $5CaO.3Al_2O_3$ (stable form) | | $nNa=1.608\pm0.002$ | Isometric | |
| $CaO.Al_2O_3$ | | $\alpha=1.641\pm0.002, \beta=1.654\pm0.003, \gamma=1.661\pm0.002$ | Probably monoclinic. | 2V=36°±4°. |

A series of examples are given to show the conversion of alumina in Ross clay with the following percentage composition: $Al_2O_3$, 38.50; CaO, 0.68; $SiO_2$, 43.34; $TiO_2$, 2.42; $Fe_2O_3$, 0.68; ign. loss, 18.43 when sintered with Hook's limestone with the following percentage composition: CaO, 55.5; $SiO_2$, 0.17; MgO, 0.51; $R_2O_3$, 0.33; ign. loss, 43.4, in the proportion of 33% by weight of clay and 67% by weight of limestone. In order to make a more accurate representation of the influence of the added small proportion of one of the principal end components, it was necessary to hold the mixtures at sintering temperature for a relatively short-time interval so that the rate of reaction could be judged by the percentage of alumina made soluble in the limited time. In Table II below is shown the effect of various additions of synthetically prepared compounds to clay-limestone mixtures on the percentage of alumina made soluble by sintering the mixtures for a period of five minutes at 1390° C.

*Table II*

| Material added | Amount Added, Percent of Mixture | Alumina Solubility, Percent of total $Al_2O_3$ | Increase in Solubility, Percent of total $Al_2O_3$ |
| --- | --- | --- | --- |
| None (control) | | 23 | |
| $CaO.Al_2O_3$ | 1 | 37 | 14 |
| $CaO.Al_2O_3$ | 2 | 39 | 16 |
| $5CaO.3Al_2O_3$ | 1 | 35 | 12 |
| $5CaO.3Al_2O_3$ | 2 | 38 | 15 |
| $2CaO.SiO_2$ | 1 | 41 | 18 |
| $2CaO.SiO_2$ | 2 | 35 | 12 |

The data in the preceding table show that the process of the present invention, wherein a small proportion of the material having a crystal structure and chemical composition of at least one of the principal end components of the sinter at equilibrium increases the percent of extractable alumina by from 52% to 78% under the conditions which such data were obtained.

The time of treatment in semi-plant or plant-scale operation may extend for a period of thirty to ninety minutes with a temperature of 1370° C. The time required for conversion of the alumina in the charge to an extractable form by the addition of 1% of the added material of the present invention was reduced to ten minutes which is at least one-third of that required without the addition of added material, and the percentage of extractable alumina was increased from 70% to 83% which is an increase of 18%.

It will be seen, therefore, that this invention actually may be carried out by the use of various modifications and changes without departing from its spirit and scope.

I claim:

1. Process of making a calcium aluminate sinter from finely divided, highly siliceous aluminum ore and limestone whereby the alumina content of the ore is more readily rendered soluble in dilute sodium carbonate solution, which comprises (a) mixing intimately with the finely divided ore and limestone a material having a crystal structure and chemical composition of at least one of the principal end components of the sinter at equilibrium, said admixed material being incorporated in an amount sufficient to substantially increase the solubility of the alumina in the mixture after sintering, and (b) sintering the mixture so prepared.

2. Process of making a calcium aluminate sinter from finely divided, highly siliceous aluminum ore and limetsone whereby the alumina content of the ore is more readily rendered soluble in dilute sodium carbonate solutions, which comprises (a) mixing intimately with a finely divided ore and limestone about 1% to 2% of calcium aluminate with composition corresponding to the formula $CaO.Al_2O_3$, and (b) sintering the mixture so prepared.

3. Process of making a calcium aluminate sinter from finely divided, highly siliceous aluminum ore and limestone whereby the alumina content of the ore is more readily rendered soluble in dilute sodium carbonate solutions, which comprises (a) mixing intimately with the finely divided ore and limestone about 1% to 2% of calcium aluminate with a composition corresponding to the formula $5CaO.3Al_2O_3$, and (b) sintering the mixture so prepared.

4. Process of making a calcium aluminate sinter from finely divided, highly siliceous aluminum ore and limestone whereby the alumina content of the ore is more readily rendered soluble in dilute sodium carbonate solutions, which comprises (a) mixing intimately with the finely divided ore and limestone about 1% to 2% of calcium silicate with a composition corresponding to the formula $2CaO.SiO_2$, and (b) sintering the mixture so prepared.

KELLY L. ELMORE.

REFERENCES CITED

The following references are of record in the file of this patent:

UNITED STATES PATENTS

| Number | Name | Date |
| --- | --- | --- |
| 1,891,608 | Scheidt | Dec. 20, 1932 |
| 2,141,132 | Folges | Dec. 20, 1938 |

FOREIGN PATENTS

| Number | Country | Date |
| --- | --- | --- |
| 17,356 | Great Britain | 1908 |